US011159052B2

(12) United States Patent
Pforr

(10) Patent No.: US 11,159,052 B2
(45) Date of Patent: Oct. 26, 2021

(54) SYSTEM AND METHOD FOR INDUCTIVE ENERGY TRANSMISSION

(71) Applicant: Technische Hochschule Ingolstadt, Ingolstadt (DE)

(72) Inventor: Johannes Pforr, Munich (DE)

(73) Assignee: Technische Hochschule Ingolstadt, Ingolstadt (DE)

( * ) Notice: Subject to any disclaimer, the term of this patent is extended or adjusted under 35 U.S.C. 154(b) by 105 days.

(21) Appl. No.: 16/323,599

(22) PCT Filed: Aug. 4, 2017

(86) PCT No.: PCT/EP2017/069848
§ 371 (c)(1),
(2) Date: Feb. 6, 2019

(87) PCT Pub. No.: WO2018/029114
PCT Pub. Date: Feb. 15, 2018

(65) Prior Publication Data
US 2020/0212714 A1    Jul. 2, 2020

(30) Foreign Application Priority Data

Aug. 11, 2016 (DE) .................... 10 2016 114 941.1

(51) Int. Cl.
*H02J 50/12* (2016.01)
*B60L 53/122* (2019.01)
(Continued)

(52) U.S. Cl.
CPC .............. *H02J 50/12* (2016.02); *B60L 53/12* (2019.02); *B60L 53/122* (2019.02); *H01F 38/14* (2013.01)

(58) Field of Classification Search
CPC ........ H02J 50/12; B60L 53/12; B60L 53/122; H01F 38/14
See application file for complete search history.

(56) References Cited

U.S. PATENT DOCUMENTS

2010/0109443 A1    5/2010  Cook et al.
2010/0148723 A1    6/2010  Cook et al.
(Continued)

FOREIGN PATENT DOCUMENTS

JP    2001197737 A    7/2001
WO   2009149464 A2   12/2009
(Continued)

OTHER PUBLICATIONS

International Preliminary Report on Patentability dated Feb. 12, 2019 for International Application No. PCT/EP2017/069848.
(Continued)

*Primary Examiner* — Carlos Amaya
(74) *Attorney, Agent, or Firm* — Eschweiler & Potashnik, LLC

(57) ABSTRACT

The invention relates to a system and to a method for the inductive transmission of energy, comprising feeding a first resonant circuit with a plurality of current pulses and inductively transmitting energy from the first resonant circuit to a second resonant circuit, which is inductively coupled to the first resonant circuit, wherein the current pulses flow through a switch of a first power stage, which switch is coupled to the first resonant circuit and is periodically switched on.

32 Claims, 14 Drawing Sheets

(51) Int. Cl.
    B60L 53/12    (2019.01)
    H01F 38/14    (2006.01)

(56) References Cited

U.S. PATENT DOCUMENTS

| | | | |
|---|---|---|---|
| 2011/0254377 A1 | 10/2011 | Wildmer et al. | |
| 2013/0033118 A1 | 2/2013 | Karalis et al. | |
| 2013/0188408 A1* | 7/2013 | Yamamoto | H02M 7/42 363/140 |
| 2014/0175868 A1* | 6/2014 | Sakakibara | H02J 50/23 307/9.1 |
| 2014/0368056 A1* | 12/2014 | Hosotani | H04B 5/0037 307/104 |
| 2019/0115788 A1* | 4/2019 | Zhang | H02J 50/12 |

FOREIGN PATENT DOCUMENTS

| | | |
|---|---|---|
| WO | 2013020138 A2 | 2/2013 |
| WO | 2014191760 A1 | 12/2014 |
| WO | 2016118020 A1 | 7/2016 |

OTHER PUBLICATIONS

Forsyth et al. "A Transformer Coupled Single-Ended Parallel Resonant Converter." IEEE 1990 Fourth International Conference on Power Electronics and Variable-Speed Drives (Conf. Publ. No. 324), Jul. 17-19, 1990.

Liu et al. "New Class-E DC-DC Converter Topologies With Constant Switching Frequency." IEEE Transactions on Industry Applications, vol. 12, No. 4, Jul./Aug. 1996.

Low et al. "Design and Test of a High-Power High-Efficiency Loosely Coupled Planar Wireless Power Transfer System." IEEE Transactions on Industrial Electronics, vol. 56, No. 5, May 2009.

Nagashima et al. "Inductively Coupled Wireless Power Transfer With Class-E2 DC-DC Converter." IEEE 2013 European Conference on Circuit Theory and Design (ECCTD), Sep. 8-12, 2013.

Luk et al. "State-Space Modeling of a Class E2 Converter for Inductive Links." IEEE Transactions on Power Electronics. vol. 30, No. 6, Jun. 2015.

Nagashima et al. "Analytical Design Procedure for Resonant Inductively Coupled Wireless Power Transfer System With Class-E2 DC-DC-Converter." IEEE International Symposium on Circuits and Systems (ISCAS), Jun. 1-5, 2014.

Luk et al. "Analysis and Design of a Class D Rectifier for a Class E Driven Wireless Power Transfer System." IEEE Energy Conversion Congress and Exposition (ECCE), Sep. 14-18, 2014.

Diekhans et al. "A Dual-Side Controlled Inductive Power Transfer System Optimized for Large Coupling Factor Variations and Partial Load." IEEE Transactions on Power Electronics, vol. 30, No. 11, Nov. 2015.

Berger et al. "A Wireless Charging System Applying Phase-Shift and Amplitude Control to Maximize Efficiency and Extractable Power." IEEE Transactions on Power Electronics, vol. 30, No. 11, Nov. 2015.

Aldhaher, Samer. "Design and Optimization of Switched-Mode Circuits for Inductive Links." Cranfield University, Jan. 2014.

Lidow et al. "Performance Evaluation of Enhancement-Mode GaN Transistors in Class-D and Class-E Wireless Power Transfer Systems." Bodo's Power Systems, May 2014.

Fisher et al. "Electric Vehicle Wireless Charging Technology: A State-of-the-Art Review." Wireless Power Transfer, Cambridge University Press, Mar. 17, 2014.

Nagoorkar, Varun. "Midrange Magnetically-Coupled Resonant Circuit Wireless Power Transfer." The University of Texas at Tyler, May 2014.

Kesler, Morris. "Highly Resonant Wireless Power Transfer: Safe, Efficient, and Over Distance." Published in 2013.

Kazimierczuk, et al. "Resonant DC/DC Converter With Class-E Inverter and Class-E Rectifier." IEEE Transactions on Industrial Electronics, vol. 36, No. 4, Nov. 1989.

Thippayanet et al. "Push-Pull Zero-Voltage Switching Resonant DC-DC Converter Based on Half Bridge Class-DE Rectifier." IEEE 10th International Conference on Power Electronics and Drive Systems (PEDS), Apr. 22-25, 2013.

Lin et al. "Class L—A New Single-Ended DC-to-AC Power Inverter." IEEE Proceedings of APEC 97—Applied Power Electronics Conference, Feb. 27, 1997.

Kurs et al. "Wireless Power Transfer via Strongly Coupled Magnetic Resonance." Science 317, 83 (2007), published on Jul. 6, 2007.

Sample et al. "Analysis, Experimental Results, and Range Adaptation of Magnetically Coupled Resonators for Wireless Power Transfer." IEEE Transactions on Industrial Electronics, Mar. 2011.

Ahn et al. "A Transmitter or a Receiver Consisting of Two Strongly-Coupled Resonators for Enhanced Resonant Coupling in Wireless Power Transfer." IEEE Transactions on Industrial Electronics, vol. 61, Issue 3, Mar. 2014.

Sugimura et al. "A Voltage-Fed Series Load Resonant High Frequency Inverter With ZCS-PDM Scheme for Induction-Heated Fusing Roller and Extended Circuit Topologies." IEEE 2006 3rd IET International Conference on Power Electronics, Machines and Drives—PEMD 2006, Apr. 4-6, 2006.

International Search Report dated Nov. 7, 2017 for International Application No. PCT/EP2017/069848.

Aldhaher et al. "13.56MHz 50W Load-Independent Synchronous Class E Rectifier using GaN devices for Space-Constrained Applications." 2018 IEEE Wireless Power Transfer Conference (WPTC), published on Feb. 14, 2019.

Li et al. "A Class E2 Inverter-Rectifier-Based Bidirectional Wireless Power Transfer System." 2018 IEEE 4th Southern Power Electronics Conference (SPEC), published on Feb. 7, 2019.

Lin et al. "A Unified Treatment of a Family of ZVS and ZCS Resonant Inverters." 28th Annual IEEE Power Electronics Specialists Conference, published on Jun. 27, 1997.

Roslaniec et al. "Design of Single-Switch Inverters for Variable Resistance/Load Modulation Operation." IEEE Transactions on Power Electronics, vol. 30, No. 6, Jun. 2015, published on Jun. 18, 2014.

* cited by examiner

SYSTEM AND METHOD FOR INDUCTIVE ENERGY TRANSMISSION

FIELD OF THE INVENTION

The present invention relates to a system and a method for transmitting energy by means of induction. In particular, the present invention relates to a system and a method for contactless inductive energy transmission between a first circuit and a second circuit, for example, to charge a traction battery.

BACKGROUND

In a wide variety of technical applications, energy must be transmitted between circuits. If it is not possible or not desired to connect the circuits using electrical conductors, the energy can be transmitted contactlessly by means of inductive coupling. For example, by means of a coil that is connected to an alternating current, an electromagnetic alternating field can be generated which induces an alternating voltage in a coil exposed to the alternating field. An advantage of this method is the maximally low-loss transmission of the energy, which can be implemented at low cost and is robust against interference.

SUMMARY

The present invention is based on the recognition that by improving the symmetry of the circuits and by symmetric supply and extraction of energy, an operating point can be reached at which an input voltage to the input power stage is sufficient to avoid reverse current flows into the input stage, so that the input stage can be reduced to a circuit for pulsed feeding of the oscillator circuit. This is achieved by the energy that is fed into the oscillator circuit (minus the losses) before the next zero-current crossing being transmitted (as far as possible) completely from the first oscillator circuit to the second oscillator circuit, for example by the extraction of energy (which is time-delayed due to the phase shift between the oscillations of the oscillator circuits caused by the inductive coupling) taking place (mirror-)symmetrically in relation to the energy supply. This fact is exploited in a system according to the invention and a method according to the invention, by the input stage in the "push" or "pull" mode being essentially reduced to a (single) actively controlled switch for the pulsed supply of an oscillator circuit.

A system according to the invention for inductive energy transmission, comprises a first circuit and a second circuit, wherein the first circuit comprises a first oscillator circuit and the second circuit comprises a second oscillator circuit, wherein the first oscillator circuit and the second oscillator circuit are configured and designed to be inductively coupled during the inductive energy transmission, wherein the first resonant circuit is coupled via a switch to an electrical connector, which is configured and designed to be connected to an electrical supply line during the inductive energy transmission, and wherein the switch is also connected to a control logic, which is configured and designed to turn the switch on and off again during an oscillation period of the first oscillator circuit, wherein a current pulse flows through the switch during the inductive energy transmission after the switch is turned on before it is turned off, wherein energy is fed to the first resonant circuit by means of the current pulse flowing through the switch.

By providing the power stage which feeds the first oscillator circuit outside of the first oscillator circuit it is possible to prevent resonance currents of the first oscillator circuit from flowing through the switch of the power stage, such as is the case for a power stage implemented as a half bridge or full bridge. Thus, power losses induced by the power stage can be reduced.

The first oscillator circuit is preferably designed as a parallel resonant circuit and is coupled to the switch via a first inductive component connected in series with the switch.

Due to the current output of the power stage caused by this, the output voltage of the power stage can be increased and the current flow in the first oscillator circuit can be reduced, so that the system can be implemented more simply and in a more compact form.

The first oscillator circuit is preferably coupled to the switch via a transformer circuit which comprises the first inductive component.

The provision of a transformer circuit allows a smaller current flow and a higher voltage to be obtained in the first resonant circuit and thereby the impedance of the first oscillator circuit to be adjusted. Furthermore, by the provision of different transformer ratios, for example using coils with a different number of windings which can be selected, for example by means of electro-mechanical relays, an output voltage generated by the second circuit can be matched to different consumers.

The first oscillator circuit is preferably configured and designed to be inductively coupled to the second oscillator circuit via the transformer circuit during the inductive energy transmission.

Therefore, the first circuit can be implemented using two (or, in the case of different transformer ratios, a plurality of) windings, which can be wound, for example, around a common core. This allows the system to be implemented in a more efficient and compact form.

In a further preferred embodiment the first oscillator circuit is designed as a series resonant circuit and connected in parallel with a first inductive component.

The first oscillator circuit and the second oscillator circuit preferably have an equal nominal resonant frequency.

This reduces the occurrence of voltages driving reverse currents at the switch, wherein the latter can be designed as a full-wave switch without having to accept significant power losses. This allows the system to be implemented more efficiently and in a more compact form, since for an implementation using a three-pole transistor circuit, for example, no anti-serially connected diode or anti-serially connected transistor circuit is required in order to prevent significant reverse currents through the switch. Furthermore, when using an anti-serially connected diode or an anti-serially connected transistor circuit in series with the switch, the requirement on the breakdown strength of the same can be reduced, since they are only subjected to low voltages.

The first oscillator circuit and the second oscillator circuit preferably have an equal nominal capacitance and inductance.

This increases the symmetry of the circuits and therefore reduces the occurrence of voltages which drive reverse currents through the switch, wherein the latter can be designed as a full-wave switch, without having to accept noticeable loss of power. This enables the efficiency of the system to be further increased. Furthermore, when using an anti-serially connected diode or an anti-serially connected transistor circuit in series with the switch, the requirement on the breakdown strength of the same can be further reduced, since they are only subjected to very low voltages.

Preferably, the second oscillator circuit is coupled via a second switch to a second connector, which is configured and designed to be connected to a second electrical supply line during the inductive energy transmission, wherein the second switch is also connected to a second control logic, which is configured and designed to turn the second switch on and off again during an oscillation period of the second oscillator circuit, wherein during the inductive energy transmission a second current pulse flows through the second switch after turning on and before turning off the second switch, wherein energy is extracted from the second oscillator circuit by means of the current pulse flowing through the second switch.

The provision of a second actively switchable power output stage enables a bi-directional energy flow between the circuits. The provision of the second switch also allows a fine-tuning of the operating point in the quasi-steady-state operating mode by means of a variation of the activation time while maintaining the switching frequency specified by the first switch. By variation of the operating point, losses and unwanted asymmetries in the system can be at least partially compensated and the occurrence of voltages which drive reverse currents through the switch can be thereby reduced or prevented.

The first oscillator circuit is preferably designed as a parallel resonant circuit and is coupled to the second switch via a second inductive component connected in series with the second switch.

Due to the current output of the second power stage produced by this, when energy flows from the second oscillator circuit to the first oscillator circuit the output voltage of the power stage can be increased and the current flow in the second oscillator circuit can be reduced, so that the system can be implemented more simply and in a more compact form.

The second switch is preferably coupled to the second oscillator circuit via a transformer circuit which comprises the second inductive component.

The provision of a transformer circuit allows a smaller current flow and a higher voltage to be obtained in the second oscillator circuit and the impedance of the second oscillator circuit to be adjusted. Furthermore, by the provision of different transformer ratios, for example using coils with a different number of windings which can be selected, for example by means of electromechanical relays, an output voltage generated by the second circuit can be matched to different consumers.

In a further preferred embodiment the second oscillator circuit is designed as a series resonant circuit and connected in parallel with a second inductive component.

The second control logic is also preferably configured not to turn the activated second switch off again after it is turned on until after the second current pulse through the second switch has decayed.

Waiting until the decay of the current allows a soft switching of the second switch and therefore reduces the robustness requirements on the second switch.

The second switch is preferably designed as a semiconductor switch and the second control logic is also configured to turn the activated second semiconductor switch off again after it is turned on, before or immediately after a reverse current through the second semiconductor switch following the second current pulse has decayed.

Waiting until the decay of the reverse current reduces the robustness requirements on the second switch and/or reduces the occurrence of power losses due to the reverse current through the second switch.

Preferably, the second control logic is configured to receive a control command from the first control logic and in response to the control command, to admit a return current through the second switch after the decay of the current through the second switch.

This enables the occurrence of a voltage on the switch, which drives a reverse current through the switch, to be reduced and lowers the robustness requirements on the switch and/or reduces power losses induced by the reverse current. This measure also allows the load on the switch and on the second switch to be matched to each other or balanced out. For example, by means of a shift in the operating point of the system in the quasi-steady-state operating mode, i.e. by variation of the time of activation of the second switch, the second switch can be driven at an operating point in which a greater reverse current through the second switch occurs than in another operating point at which it is or can be driven, and can adopt or maintain this operating point in response to the control command, in order to reduce the load on the switch and increase the efficiency of the first circuit. In addition, the first control logic can be configured to receive a second control command from the second control logic and to increase or decrease a switching frequency of the switch in response to the second control command. This allows, for example, a charging current for a battery to be adjusted.

Preferably, the second control logic and the second switch are configured to form a zero-current-switched Class-E power stage during the inductive energy transmission.

By turning off the second switch at (approximately) zero-current and at a gradient of the current curve $di(t)/dt$ of (approximately) zero, the requirements on the second switch with respect to deactivation speed are reduced. Furthermore, the design of a zero-current-switched class-E power stage can be improved by using a saturation inductance, connected in series with the second switch, which desaturates at small currents and thereby further reduces the requirements on the second switch with respect to deactivation speed.

Preferably, the first circuit and the second circuit are symmetrical.

The result achieved by the symmetry of the circuits is that in quasi-steady-state operation, no or negligible voltages occur that drive reverse currents through the switch and the second switch. In this context, however, it should be understood that the term "symmetry" refers in particular to the provision of nominally identical components that are symmetrically wired in the circuit, wherein it is clear that in practice, due to production-related variations even nominally identical components are often not exactly identical, which means that a system with minimal, production-related real asymmetries is also deemed to be included in this context. In addition, it is clear that the term "symmetry" relates primarily to the relevant electrical parameters such as inductances, capacitances, resistances, impedances, etc., and the use of identical components, possibly from the same production batch, is only to be viewed as a special case, even if a preferred one, of symmetrical circuits.

The control logics are preferably configured to control a flow of energy from the first circuit to the second circuit by a variation of the activation time of the switch and a variation of the activation time of the second switch.

For example, the variation of the switching frequency of the switch can be used to achieve an increase or reduction in the energy flow and variation of the activation time of the second switch can be used to optimise the operating point of the switches, which enables, for example, a zero-current-switching even for different input and output voltages of the circuits while at the same time minimizing the reverse currents.

The second control logic is preferably configured to vary an activation time of the second switch while maintaining a switching frequency specified by the first switch, in order to control the size of the energy flow from the first circuit to the second circuit.

This can be used, for example, to adjust the power and is used when a frequency range necessary for a desired power variation is not available, or in order to perform a self-test of the system. For example, the power to be transmitted between the circuits can be reduced to zero by means of a shift in the activation time of the second switch, in order to calibrate the inductive charging system and determine operating parameters in this "zero-power" operating mode.

The control logic is preferably configured to detect voltages and/or currents that drive reverse currents through the switch and the second control logic is configured to vary an activation time of the second switch, while maintaining a switching frequency specified by the first switch, in order to reduce the voltages that drive reverse currents through the switch.

By the variation of the activation time of the second switch it is possible to ensure that the switch always operates in the "optimum" mode under constant input voltage and variable output voltage, i.e. when the switch is turned off $di(t)/dt=0$ (independent of the output voltage). In addition, variation of the activation time of the second switch means it is possible to ensure that even with tolerance-prone components (e.g. capacitors and inductors), which disturb the symmetry of the circuits, the switch always switches at zero current (i.e. with $di(t)/dt=0$), or close to zero current. To control the activation time of the second switch depending on the current flow through the switch, for example, a communication interface can be provided, by means of which control commands are transmitted which cause the activation time of the second switch to be adjusted in order to reduce voltages that drive reverse currents through the switch.

In a further preferred embodiment, the second oscillator circuit is coupled via a passive rectifier element to a second connector, which is configured and designed to be connected to a second electrical supply line during the inductive energy transmission, and the second oscillator circuit feeds the second electrical supply line with a second current pulse through the passive rectifier element during the inductive power transmission, wherein energy is extracted from the second oscillator circuit by means of the second current pulse flowing through the passive rectifier element.

By the provision of a passive rectifier element, such as a diode, the second circuit can be implemented particularly simply and cost-effectively. In this case, however, there is no facility for fine tuning of the operating point by variation of the activation time of the second switch, so that in this context it can be advantageous to provide an adjustable-value capacitance and/or inductance of the first oscillator circuit, which is or are varied in operation at a constant switching frequency of the switch in such a way that the occurrence of voltages that drive reverse currents through the switch is reduced or avoided.

The control logic is preferably configured to detect voltages and/or currents that drive reverse currents through the switch and to vary an input voltage of the first circuit, in order to reduce the voltages that drive reverse currents through the switch.

If, for example, the switch or the passive rectifier element, for example due to a sufficiently high blocking voltage, offers some "leeway" for the variation of the input voltage (e.g. by the switch being designed as a silicon carbide MOSFET (SiC-MOSFET) and/or the passive rectifier element as a SiC-diode), then the "optimal" operation of the switch (i.e. an operation with $di(t)/dt=0$ on deactivation) can be achieved under variation of the output voltage even without the presence of a second controllable switch.

The variation of the input voltage can be effected, for example, by an active rectifier, wherein the output voltage of the active rectifier (or the input voltage of the first circuit) is adjusted such that, regardless of the output voltage of the second circuit, $di(t)/dt=0$ is obtained when the switch is turned off.

Preferably, during the inductive energy transmission a reduction of the current flowing in the first oscillator circuit, induced in the first oscillator circuit due to the extraction of energy from the second oscillator circuit, is overcompensated immediately after the switch is turned on.

Therefore the switching of the switch is clocked by the control logic in such a way that, while the energy fed into the first oscillator circuit and the energy drawn from the second oscillator takes place with a time delay, the time delay nevertheless correlates with or matches the phase shift resulting from the inductive coupling between the first and second oscillator circuit. This ensures that any deviation of the oscillation from a sinusoidal shape is reduced and the currents in the oscillator circuit are not excessively increased.

The over-compensation preferably persists for half of a switched-on period.

This allows the over-compensation to be compensated by an under-compensation which is symmetrical to the over-compensation in relation to the energy flow, which means a voltage driving reverse currents through the switch can be reduced or prevented.

The overcompensation is preferably immediately followed by an under-compensation, which lasts until a surplus current flow produced by the overcompensation in the first oscillator circuit is balanced out again.

Due to the immediate balancing of the surplus current flow, the currents in the oscillator circuit are reduced and the efficiency of the system is thereby increased.

Preferably, the switch and/or the second switch are designed as full-wave switches.

The use of full-wave switches, i.e. of switches that only switch currents in one direction through the switch or the second switch, allows the circuits to be implemented at low cost.

The control logic is also preferably configured not to switch the activated switch off again once it is switched on, until after a current through the switch has decayed.

Waiting until the current has decayed allows a soft switching of the switch and therefore reduces the robustness requirements on the switch.

The second switch is preferably designed as a semiconductor switch and the control logic is also preferably configured to turn the activated semiconductor switch off again once it is turned on, before or immediately after a reverse current through the semiconductor switch following the current pulse has decayed.

Waiting until the reverse current has decayed lowers the robustness requirements on the switch and/or reduces the occurrence of power losses due to the reverse current through the switch.

Preferably, the control logic and the switch are configured to form a zero-current-switched class-E power stage during the inductive energy transmission.

By turning off the switch at (approximately) zero-current and at a gradient of the current curve di(t)/dt of (approximately) zero, the requirements on the switch with respect to deactivation speed are reduced. Furthermore, the design of a zero-current-switched class-E power stage can be improved by using a saturation inductance connected in series with the second switch, which desaturates at small currents and thereby further reduces the requirements on the switch with respect to deactivation speed.

The control logic is further configured to measure a current flow through the switch.

The measurement of the current flow through the switch allows a more precise determination of the deactivation time than, for example, determining the current flow through the switch from a measurement of the voltage or the current flow in the first oscillator circuit, which would also be possible, however.

Preferably, the first oscillator circuit is a semiconductor-switch free oscillator circuit.

This avoids a power loss being induced in the first oscillator circuit by a semiconductor switch, as could occur, for example if a bridge circuit were used.

The first oscillator circuit is preferably also coupled to the electrical connector via a third switch and the third switch is also connected to the control logic, which is configured to switch the third switch on and off again during the oscillation period of the first oscillator circuit with a time delay relative to the first switch, wherein during the inductive energy transmission after the third switch is turned on and before it is turned off, a third current pulse flows through the third switch, whose current direction is opposite that of the first current pulse, and wherein energy is supplied to the first oscillator circuit by means of the current pulse flowing through the third switch.

As a result, a "push-pull" arrangement is implemented, which allows the energy transmission to be increased. In particular, by the second oscillator circuit being coupled to the second connector via a fourth switch, wherein the fourth switch is also connected to the second control logic, which is configured and designed to switch the fourth switch on and off again during an oscillation period of the second oscillator circuit with a time delay relative to the second switch, wherein during the inductive energy transmission a fourth current pulse flows through the fourth switch after the fourth switch is turned on and before it is turned off, wherein energy is extracted from the second oscillator circuit by means of the fourth current pulse flowing through the fourth switch.

The first oscillator circuit is preferably designed as a parallel resonant circuit and is coupled to the third switch via a second inductive component connected in series with the third switch.

Due to the current output of the power stage produced as a result, the output voltage of the third power stage can be increased and the current flow in the first oscillator circuit can be reduced, which means that the system can be implemented more cost-effectively and in a more compact form.

The first oscillator circuit is preferably coupled to the third switch via a second transformer circuit which comprises the second inductive component.

The provision of a second transformer circuit allows a smaller current flow and a higher voltage to be obtained in the first resonant circuit and the impedance of the first oscillator circuit to be adjusted. Furthermore, by the provision of different transformer ratios, for example using coils with a different number of windings which can be selected, for example, by means of electro-mechanical relays, an output voltage generated by the second circuit can be matched to different consumers.

The first oscillator circuit is preferably configured and designed to be inductively coupled to the second oscillator circuit via the second transformer circuit during the inductive energy transmission.

Therefore, the first circuit can be implemented using two or three windings, which can be wound, for example, around a common core. This allows the system to be implemented in a more cost-effective and compact way.

The second oscillator circuit is preferably coupled to a vehicle battery.

This allows power supply fluctuations into a power supply network to be buffered in the event of bi-directional energy flow.

A method according to the invention for inductive transmission of energy between a first circuit and a second circuit, wherein the first circuit comprises a first oscillator circuit and the second circuit comprises a second oscillator circuit and the first oscillator circuit is connected to an electrical supply line via a switch, comprises an inductive transmission of the energy supplied to the first oscillator circuit to the second oscillator circuit, which is inductively coupled to the first oscillator circuit, and a supply of energy into the first oscillator circuit by means of a current pulse flowing through the switch.

By providing the power stage which feeds the first oscillator circuit outside of the first oscillator circuit it is possible to prevent resonance currents of the first oscillator circuit from flowing through the switch of the power stage, such as is the case for a power stage implemented as a half bridge or full bridge. The power losses induced by the power stage can be therefore reduced. It should also be mentioned that the method according to the invention is provided, in particular, for operating the system, and the content disclosed in connection with the system is intended to also apply analogously in connection with the method and vice versa.

Preferably, the first oscillator circuit is designed as a parallel resonant circuit and is coupled to the switch via a first inductive component connected in series with the switch.

Due to the current output of the power stage produced by this, the output voltage of the power stage can be increased and the current flow in the first oscillator circuit can be reduced, so that the system can be implemented more cost-effectively and in a more compact form.

The first oscillator circuit is preferably coupled to the switch via a transformer circuit which comprises the first inductive component.

The provision of a transformer circuit allows a smaller current flow and a higher voltage to be obtained in the first oscillator circuit and the impedance of the first oscillator circuit to be adjusted.

Preferably, the first oscillator circuit is inductively coupled to the second oscillator circuit via the transformer circuit.

Therefore, the first circuit can be implemented using two windings, which can be wound, for example, around a common core. This allows the first circuit to be implemented in a more cost-effective and compact way.

In a further preferred embodiment the first oscillator circuit is designed as a series resonant circuit and connected in parallel with a first inductive component.

The first oscillator circuit and the second oscillator circuit preferably have an equal nominal resonant frequency.

This reduces the occurrence of voltages driving reverse currents at the switch, wherein the latter can be designed as a full-wave switch without having to accept significant power losses. This allows the system to be implemented more efficiently and in a more compact form, since for example, for an implementation using a three-pole transistor circuit no anti-serially connected diode or anti-serially connected transistor circuit is required.

The first oscillator circuit and the second oscillator circuit preferably have an equal nominal capacitance and inductance.

This further reduces the occurrence of voltages driving reverse currents at the switch, wherein the latter can be designed as a full-wave switch without having to accept significant power losses. This enables the efficiency of the system to be further increased.

The second oscillator circuit is preferably coupled via a second switch to a second connector, which is connected to a second electrical supply line, and the method also comprises an extraction of energy from the second oscillator circuit by means of a current pulse flowing through the second switch.

The provision of a second actively switchable power output stage enables a bi-directional energy flow.

The first oscillator circuit is preferably designed as a parallel resonant circuit and is coupled to the second switch via a second inductive component connected in series with the second switch.

Due to the current output of the second power stage produced thereby, when energy flows from the second oscillator circuit to the first oscillator circuit the output voltage of the second power stage can be increased and the current flow in the second oscillator circuit can be reduced, which means the second circuit can be implemented more cost-effectively and in a more compact form.

The second switch is preferably coupled to the second oscillator circuit via a transformer circuit which comprises the second inductive component.

The provision of a transformer circuit allows a smaller current flow and a higher voltage to be obtained in the second oscillator circuit and the impedance of the second oscillator circuit to be adjusted.

In a further preferred embodiment the second oscillator circuit is designed as a series resonant circuit and is connected in parallel with a second inductive component.

Preferably, the method also comprises turning the second switch on and turning the second switch off after a current through the second switch has decayed.

Waiting until the decay of the current allows a soft switching of the second switch and therefore reduces the robustness requirements on the second switch.

The second switch is preferably designed as a semiconductor switch and the second semiconductor switch is turned off before or immediately after a reverse current through the second semiconductor switch following the second current pulse has decayed.

Waiting until the decay of the reverse current reduces the robustness requirements on the second switch and/or reduces the occurrence of power losses due to the reverse current through the second switch.

The method preferably also comprises transmitting a control command from the first circuit to the second circuit, and in response to the control command, allowing a reverse current through the second switch after the decay of the current through the second switch.

This enables the occurrence of a voltage on the switch, which drives a reverse current through the switch, to be reduced and thereby reduces the robustness requirements on the switch and/or reduces power losses induced by the reverse current. This measure also allows the load on the switch and on the second switch to be matched to each other or balanced out. The method can also comprise transmission of a second control command from the first circuit to the second circuit and an increase or decrease of a switching frequency of the switch in response to the second control command. This allows, for example, a charging current for a battery to be adjusted.

The switch preferably forms part of a zero-current-switched class-E power stage.

By turning off the second switch at (approximately) zero-current and at a gradient of the current curve, $di(t)/dt$, of (approximately) zero, the requirements on the second switch with respect to deactivation speed are reduced. Furthermore, the design of a zero-current-switched class-E power stage can be improved by using a saturation inductance connected in series with the second switch, which desaturates at small currents and thereby further reduces the requirements on the second switch with respect to deactivation speed.

Preferably, the first circuit and the second circuit are symmetrical.

The result achieved by the symmetry of the circuits is that in quasi-steady-state operation, no or negligible voltages occur that drive reverse currents through the switch and the second switch.

The method preferably also comprises controlling a flow of energy from the first circuit to the second circuit by a variation of the activation time of the switch and a variation of the activation time of the second switch.

By variation of the activation time of the switch an increase or decrease in the energy flow can be achieved and by variation of the activation time of the second switch the operating point of the switches can be optimized, which enables, e.g., a zero-current-switching even with different input and output voltages of the circuits while at the same time minimizing the reverse currents.

Preferably, the method comprises varying an activation time of the second switch while maintaining a switching frequency specified by the second switch, in order to control the size of the energy flow from the first circuit to the second circuit.

These steps can be used, for example, to adjust the power when the frequency range necessary for the power variation is not available or in order to perform a self-test of the system. For example, the power to be transmitted between the circuits can be reduced to zero by means of a shift in the activation time of the second switch, in order to calibrate the inductive charging system and determine operating parameters in this "zero-power" operating mode.

Preferably, the method comprises detecting voltages and/or currents, which drive reverse currents through the switch, and varying an activation time of the second switch while maintaining a switching frequency specified by the first switch, in order to reduce the voltages that drive reverse currents through the switch.

By variation of the activation time of the second switch, given appropriate control it is possible to ensure that the switch always operates in the "optimum" mode under constant input voltage and variable output voltage, i.e. when the switch is turned off $di(t)/dt=0$ (independently of the output voltage). In addition, by variation of the activation time of the second switch using appropriate control it is possible to ensure that even when tolerance-prone components are used (e.g. capacitors and inductors), which can disrupt the symmetry of the circuits, the switch always switches at zero current (i.e. with di(t)/dt=0) or close to zero current. To control the activation time of the second switch depending on the current flow through the switch, for example, a communication interface can be provided by means of which it can be communicated to the second circuit how the activation time of the second switch must be adjusted in order to reduce voltages that drive reverse currents through the switch.

In a further preferred embodiment the second oscillator circuit is coupled via a passive rectifier element to a second connector, which is connected to a second electrical supply line, wherein the second oscillator circuit feeds a second electrical supply line with a second current pulse through the passive rectifier element during the inductive power transmission, wherein energy is extracted from the second oscillator circuit by means of the second current pulse flowing through the passive rectifier element.

By the provision of a passive rectifier element, such as a diode, the second circuit can be implemented particularly simply and cost-effectively.

Preferably, the method comprises detecting voltages and/or currents which drive reverse currents through the switch, and varying an input voltage of the first circuit provided by the electrical supply line in order to reduce the voltages that drive reverse currents through the switch.

If, as noted above, the switch or the passive rectifier element, for example due to a sufficiently high blocking voltage, offers some "leeway" for the variation of the input voltage (e.g. by the switch being designed as a silicon carbide MOSFET (SiC-MOSFET) and/or the passive rectifier element as a SiC-diode), then the "optimal" operation of the switch (i.e. an operation with di(t)/dt=0 on deactivation) can be achieved under variation of the output voltage even without a second active switch.

The variation of the input voltage can be effected, for example, by an active rectifier, wherein the output voltage of the active rectifier (or the input voltage of the first circuit) is adjusted such that, regardless of the output voltage of the second circuit, di(t)/dt=0 is obtained when the switch is turned off.

Preferably, the method also comprises an overcompensation, immediately after turning on the first switch, of a reduction of the current flowing in the first resonant circuit induced in the first resonant circuit by the extraction of energy from the second oscillator circuit.

Therefore, the switching of the switch is clocked in such a way that, while the energy fed into the first oscillator circuit and the energy drawn from the second oscillator takes place with a time delay, the time delay nevertheless correlates with or matches the phase shift resulting from the inductive coupling between the first and second oscillator circuit. This ensures that any deviation of the oscillation from a sinusoidal shape is reduced and the currents in the oscillator circuit are not excessively increased.

The over-compensation preferably persists for half of a switched-on period.

This allows the over-compensation to be compensated by an under-compensation which is symmetrical to the over-compensation in relation to the energy flow, which means a voltage driving reverse currents through the switch can be reduced or prevented.

Preferably, the method also comprises balancing a surplus current flow in the first resonant circuit generated by the overcompensation by means of an under-compensation directly following the overcompensation.

Due to the immediate balancing of the surplus current flow, the currents in the oscillator circuit are reduced and the efficiency of the system is thereby increased.

Preferably, the switch and/or the second switch are designed as full-wave switches.

The use of full-wave switches allows a realization of the circuits at lower cost.

Preferably, the method also comprises turning the switch on and turning the switch off after a current through the switch has decayed.

Waiting until the current has decayed allows a soft switching of the switch and therefore reduces the robustness requirements on the switch.

The second switch is preferably designed as a semiconductor switch and the activated semiconductor switch is turned off again once it has been turned on, before or immediately after a reverse current through the semiconductor switch following the current pulse has decayed.

Waiting until the reverse current has decayed lowers the robustness requirements on the switch and/or reduces the occurrence of power losses due to the reverse current through the switch.

The switch preferably forms part of a zero-current-switched class-E power stage.

By turning off the switch at (approximately) zero-current and at a gradient of the current curve di(t)/dt of (approximately) zero, the requirements on the switch with respect to deactivation speed are reduced. Furthermore, the design of a zero-current-switched class-E power stage can be improved by using a saturation inductance connected in series with the second switch, which desaturates at small currents and thereby further reduces the requirements on the switch with respect to deactivation speed.

Preferably, the method also comprises measuring a current flow through the switch.

The measurement of the current flow through the switch allows a more precise determination of the deactivation time.

Preferably, the first oscillator circuit is a semiconductor-switch free oscillator circuit.

As a result, a power loss in the first resonant circuit induced by the switch can be prevented.

The first oscillator circuit is also preferably coupled via a third switch to the electrical connector and the method also comprises feeding energy into the first oscillator circuit by means of a third current pulse flowing through the third switch, wherein the third switch is turned on and off with a time delay relative to the switch.

As a result, a "push-pull" arrangement is implemented, which allows the energy transmission to be increased. In particular, by the second oscillator circuit being coupled to the second connector via a fourth switch, and the method additionally comprising an extraction of energy from the second oscillator circuit by means of a current pulse flowing through the fourth switch.

The first oscillator circuit is preferably designed as a parallel resonant circuit and is coupled to the third switch via a second inductive component connected in series with the third switch.

Due to the current output of the third power stage produced by this, the output voltage of the third power stage can be increased and the current flow in the first oscillator circuit can be reduced, so that the system can be implemented more cost-effectively and in a more compact form.

The first oscillator circuit is preferably coupled to the third switch via a second transformer circuit which comprises the second inductive component.

The provision of a second transformer circuit allows the current flow and the voltage in the first oscillator circuit to be changed and thereby the impedance of the first oscillator circuit to be adjusted.

Preferably, the first oscillator circuit is inductively coupled to the second oscillator circuit via the second transformer circuit.

Therefore, the first circuit can be implemented using two or three windings, which can be wound, for example, around a common core. This allows the first circuit to be implemented in a more cost-effective and compact way.

The second oscillator circuit is preferably coupled to a vehicle battery.

This allows a traction battery to be inductively charged.

The method preferably comprises extracting energy from the battery and feeding the energy drawn from the battery into the second oscillator circuit.

This allows supply fluctuations into a power network, such as can occur in the use of renewable energies, to be buffered.

BRIEF DESCRIPTION OF THE DRAWINGS

The invention is described below in the detailed description on the basis of exemplary embodiments, with reference to the drawings which show.

The same elements in the drawings are labelled with identical reference numerals and analogous elements by reference numerals with an apostrophe added, but which are otherwise identical.

DETAILED DESCRIPTION

Figure 1:
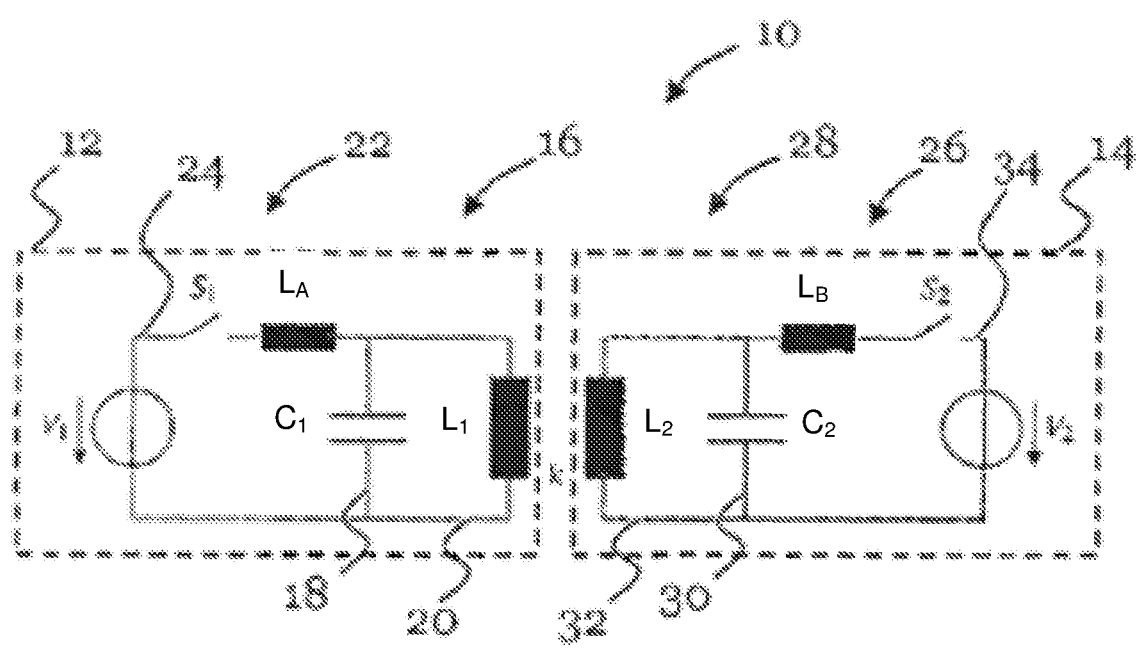
FIG. 1 an equivalent circuit diagram of a system for inductive energy transmission in accordance with a first preferred embodiment.

FIG. 1 shows an equivalent circuit diagram of a system 10 for inductive energy transmission in accordance with a first preferred embodiment. The system 10 comprises a first circuit 12 and a second circuit 14. The first circuit 12 comprises a first oscillator circuit 16. The first oscillator circuit 16 comprises a first conduction path 18, which comprises a capacitive component $C_1$ (e.g. a capacitor), and a second conduction path 20 connected in parallel with the first conduction path 18, which comprises an inductive component $L_1$ (for example a coil).

As illustrated in FIG. 1, in parallel to the first conduction path 18 and the second conduction path 20 a first power stage 22 is connected, which comprises a third conduction path 24, which is connected to the first conduction path 18 and the second conduction path 20. The third conduction path 24 comprises a first voltage source $V_1$, a first switch $S_1$ connected in series with the first voltage source $V_1$ (for example a transistor circuit) and an inductive component $L_A$ (for example a coil) connected in series with the first voltage source $V_1$ and the first switch $S_1$, which defines the shape of a current flowing through the first switch $S_1$ and/or implements a current output of the first power stage 22. Optionally, in addition to the inductive component $L_A$ a further saturation inductance (e.g. a coil) can be connected in series with the first switch $S_1$ and the inductive component $L_A$.

The second circuit 14 is designed symmetrically to the first circuit 12, i.e. the second circuit 14 can be described by an equivalent circuit diagram which corresponds to the equivalent circuit diagram of the first circuit 12, wherein all components included in an implementation of the first circuit 12 do not necessarily have to be included in an implementation of the second circuit 14 in identical form and number, wherein this is in fact considered to be a preferred implementation variant. For example, instead of the second power stage 26 the second circuit 14 can comprise an uncontrolled rectifier (for example, a diode), which enables a unidirectional flow of energy.

As illustrated in FIG. 1, the second circuit 14 comprises a second oscillator circuit 28. The second oscillator circuit 28 comprises a fourth conduction path 30, which comprises a capacitive component $C_2$ (e.g. a capacitor) and a fifth conduction path 32 connected in parallel with the first conduction path 30, which comprises an inductive component $L_2$ (for example a coil). In parallel with the fourth conduction path 30 and the fifth conduction path 32 the second output stage 26 is connected, which comprises a sixth conduction path 34 that is connected to the fourth conduction path 30 and the fifth conduction path 32. The sixth conduction path 34 comprises a second voltage source $V_2$, a second switch $S_2$ connected in series with the second voltage source $V_2$ (for example a transistor circuit) and an inductive component $L_B$ (for example a coil) connected in series with the second voltage source $V_2$ and the second switch $S_2$, which defines the shape of a current flowing through the second switch $S_2$. Optionally, in addition to the inductive component $L_B$ a further saturation inductance (e.g.

a coil) can be connected in series with the second switch $S_2$ and the inductive component $L_B$.

The first switch $S_1$ is connected to a first control logic (or a control circuit), which controls the activation and deactivation of the first switch $S_1$. To improve the clarity in the figures, the first switch $S_1$ and the first control logic are represented by a single switch symbol, wherein it should be obvious to the person skilled in the art that the first switch $S_1$ and the first control logic can be implemented as integrated circuits or separate components. During inductive energy transmission from the first circuit 12 to the second circuit 14 the first oscillator circuit 16 is fed by current pulses, which flow through the first switch $S_1$ when the first switch $S_1$ is turned on, wherein by varying the activation frequency, the frequency of the first oscillator circuit 16 and thus the transmission power can be controlled. The first control logic may also be connected to a measuring device, which is configured to measure a current flow through the first switch $S_1$ (or a voltage drop across the first switch $S_1$ or a voltage across or a current in the resonant circuit), and to determine a deactivation time of the first switch $S_1$ based on the measurement. A preferred switching sequence of the first switch $S_1$ during an oscillation period of the first oscillator circuit 16 given equal input and output voltages ($V_1=V_2$) of the system 10 is shown in FIG. 2.

Figure 2:
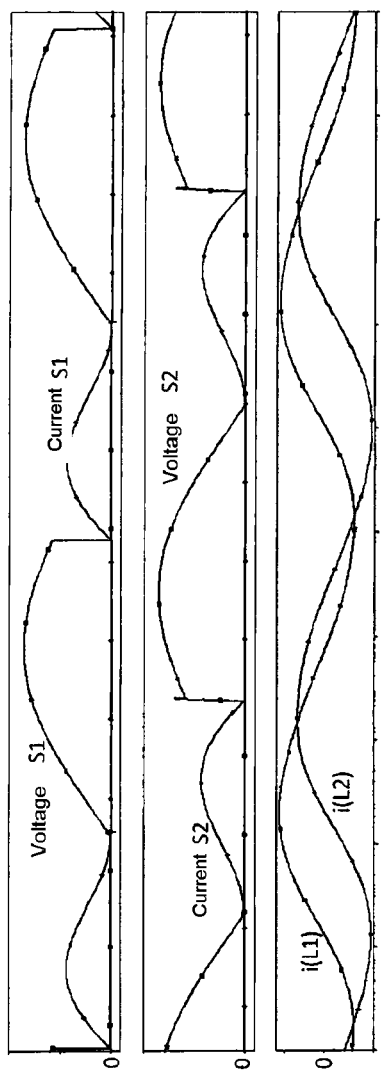
FIG. 2 example current/voltage curves in the system of FIG. 1 during two oscillation periods of an oscillator circuit of the system.

As shown in FIG. 2, the first switch $S_1$ is preferably turned off after the current flow through the first switch $S_1$ has decayed, wherein it should be noted that the first switch $S_1$ could be turned off even before the decay of the current flow through the first switch $S_1$, in which case the current pulse would decrease and the load on the first switch $S_1$ would increase, which is why the first power stage 22 is preferably designed as a zero-current-switched class-E power stage. Since the reverse current, which follows the current pulse and flows through the switch $S_1$ in the opposite direction (or with opposite sign), is negligible, the first switch $S_1$ can be realized as a (semiconductor) switch that blocks in only one direction (i.e. as a full-wave switch), for example, as a transistor circuit without an anti-serial diode or anti-serial transistor circuit.

The reverse current in this case is the smaller, the greater the degree to which the amount of energy fed into the first oscillator circuit 16 matches the amount of energy transmitted to the second oscillator 28. A correspondence of the energy quantities supplied and transmitted in an oscillation cycle can be achieved, for example, by symmetrical current and voltage characteristics in the system 10, which, in turn, is preferably achieved by means of a symmetrical structure and particularly preferably, by an identical design.

The supply and extraction of current pulses is carried out in the first circuit 12 or in the second circuit 14 during corresponding half-periods of the oscillation phases of the first oscillator circuit 16 and the second oscillator circuit 28, wherein in the case of negligible energy losses the energy profiles $V_1 i_{S1}(t)$ and $V_2 i_{S2}(t)$ corresponding to the current pulses as shown in FIG. 2 are approximately mirror symmetrical, and in the case of non-negligible energy losses the energy profile of the extracted current pulses $V_2 i_{S2}(t)$ is squeezed to reflect the energy losses.

In particular, by turning on the first switch $S_1$ a charging current of the first capacitive component $C_1$ is partly formed by the current pulse which flows through the first switch $S_1$. In order that the resulting voltage on the first capacitive component does not generate a reverse current through the first switch $S_1$ (or no voltage occurs of greater magnitude with an opposite sign to $V_1$), the current driven through the inductive component $L_1$ must be increased.

This occurs because a corresponding amount of energy is extracted from the second oscillator circuit 28 in the corresponding half-period of the oscillation phase of the second oscillator circuit 28, which increases the current driven through the inductive component $L_1$ by means of the inductive coupling. In principle, it is immaterial when the actual energy extraction is carried out, as long as the energy drawn matches the energy input minus the energy losses and is completed—taking into account the phase shift between the oscillator circuits—before a voltage across the capacitive component $C_1$ becomes too large and a reverse current develops through the first switch $S_1$. Therefore, an energy extraction which reduces or prevents a reverse current through the first switch $S_1$ can be achieved by variation of the activation time (and optionally the deactivation time) of the second switch $S_2$.

Conversely, this means that if instead of the second power stage 26 the second circuit 14 comprises the uncontrolled rectifier, the activation and deactivation of the first switch $S_1$ should be matched to the energy drawn from the second circuit 14 such that in the quasi-steady-state operation, the energy input from the current pulse corresponds to the sum of the energy extracted and energy losses. For this purpose, the first control logic can be configured to switch the first switch $S_1$ so that a reverse current through the first switch $S_1$ (or a voltage drop across the first switch $S_1$ with opposite sign to $V_1$) falls below a predetermined value, preferably to a minimum, and particularly preferably becomes zero. Because the uncontrolled rectifier corresponds to a zero-current-switched switch, the first switch $S_1$ can in turn be preferably implemented as a zero-current-switched switch and the first power stage 22 in turn can be particularly preferably implemented as a zero-current-switched class E-output stage.

In addition, if the second circuit 14, as shown in FIG. 1, comprises the second power stage 26, then the activation time (and optionally the deactivation time) of the second switch $S_2$ can be controlled on the basis of measured voltages and currents in the second output stage 26 and (optionally) on the basis of control commands from the first power stage 22, which are transmitted from the first power stage 22 to the second power stage 26 (e.g. via a wireless connection). In addition, a switching frequency of the first switch $S_1$ can be controlled based on control commands from the second power stage 26, which are transmitted from the second power stage 26 to the first power stage 22 (e.g. via a wireless connection), in order to adjust a battery charging current. For this purpose, the second switch $S_2$ is connected to a second control logic (or a control circuit), which controls the activation and deactivation of the second switch $S_2$. To improve the clarity in the figures, the second switch $S_2$ and the second control logic are represented by a single switch symbol, wherein it should be obvious to the person skilled in the art that the second switch $S_2$ and the second control logic can be implemented as integrated circuits or separate components.

Thus, in quasi-steady-state operation the second control logic can be configured to control the activation time (and optionally the deactivation time) of the second switch $S_2$ such that the reverse current through the second switch $S_2$ falls below a predetermined value, preferably to a minimum, and particularly preferably becomes zero. In the quasi-steady-state mode therefore, the second circuit 14 automatically adapts to the switching behaviour of the first circuit 12 (or the first control logic). In addition, control information can also be transmitted from the first power stage 22 to the second power stage 26, and in response to the control information the second control logic can vary the activation time (and optionally the deactivation time) of the second switch $S_2$ and in doing so, handle a larger reverse current in order to reduce or prevent a reverse current through the first switch $S_1$. The variation of the activation time (and optionally the deactivation time) of the second switch $S_2$ thus compensates asymmetrical current and voltage curves occurring in the circuits 12 and 14.

Figure 3:
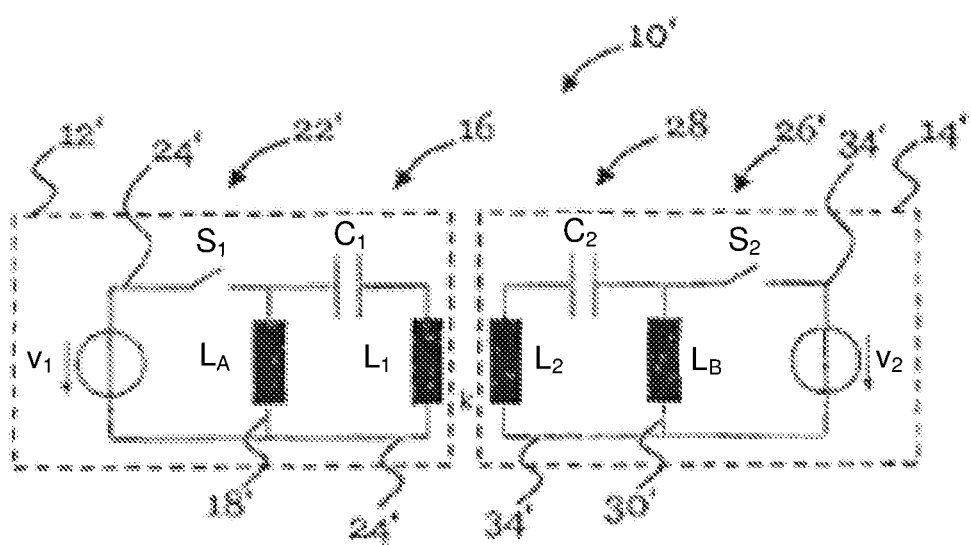
FIG. 3 an equivalent circuit diagram of a system for inductive energy transmission in accordance with a second preferred embodiment.

FIG. 3 shows an equivalent circuit diagram of a system 10' for inductive energy transmission in accordance with a second preferred embodiment. The system 10' comprises components that correspond to components of the system 10 shown in FIG. 1, but which are interconnected in a partly modified way. Thus, the first oscillator circuit 16 is not connected in parallel, but in series with the switch $S_1$. Also, the inductive component $L_A$ is connected in parallel with the input voltage $V_1$, thereby providing a voltage output of the first power stage 22'. The sequence of the control of the first switch $S_1$ is carried out by the first control logic in analogous manner.

Figure 4:
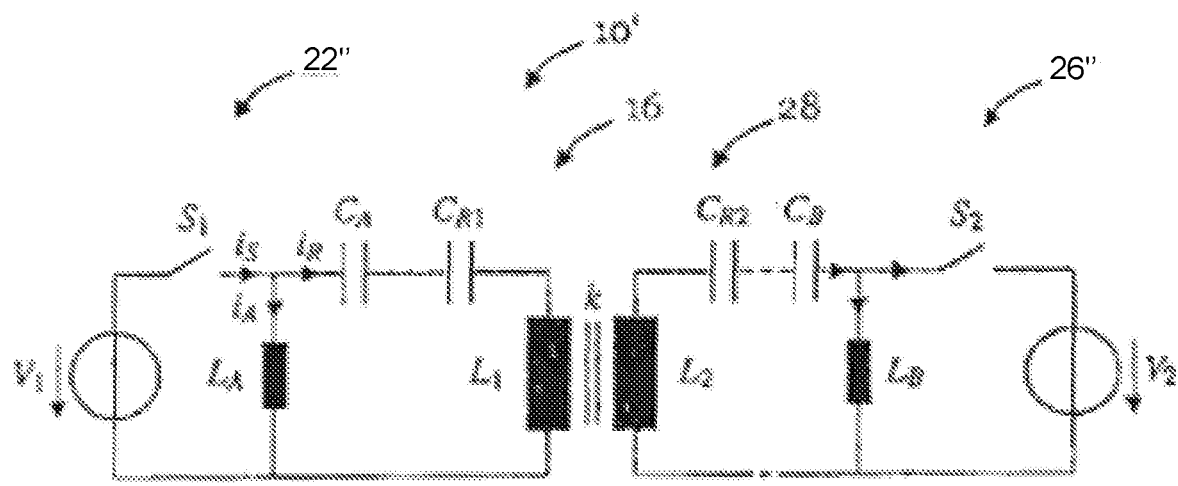
FIG. 4 an alternative equivalent circuit diagram of the system for inductive energy transmission in accordance with the second preferred embodiment.

FIG. 4 shows an alternative equivalent circuit diagram of the system 10' for inductive energy transmission in accordance with the second preferred embodiment, wherein the first capacitive component $C_1$ and the second capacitive component $C_2$ are replaced by the series-connected capacitive components $C_A$ and $C_{R1}$ or $C_B$ and $C_{R2}$ respectively. In the following analysis of the system response, the system 10' is considered under the following idealized assumptions:

The input voltage $V_1$ and the output voltage $V_2$ are assumed to be ideal, or else generated by ideal voltage sources.

The switches $S_1$ and $S_2$ are assumed to be ideal, i.e. as switching instantaneously and with zero losses.

All reactive components are assumed to be ideal and thus lossless.

The voltage outputs of the power stages 22" and 26" lead to sinusoidal resonant currents of the resonant circuits 16 and 28.

The capacitive component $C_A$ compensates for the phase delay of the first power stage 22", so that the fundamental component of the output voltage of the first power stage 22" (bordered by the left-hand dashed line) and the resonance current are in phase. The capacitive component $C_B$ compensates for the phase delay of the second power stage 26" (bordered by the right-hand dashed line), so that the resonance current and the voltage across the second power stage 26" are in phase. The sinusoidal resonance current in the first oscillator circuit 16 can be defined by $i_R(t)=\hat{I}_R \sin(\omega t-\theta_1)$, where $\hat{I}_R$ denotes the amplitude of the resonance current, w the angular frequency of the switching frequency and $\theta_1=\omega T_1$ the angle of the resonance current relative to the activation time of the switch $S_1$.

If the switch $S_1$ is turned off, the current in the inductive component $L_A$ is equal to the negative resonance current, i.e. $i_A(t)=-\hat{I}_R(t)$. If the switch $S_1$ is turned on, the current is $i_A=(V_1/L_A)t-\hat{I}_R \sin(-\theta_1)$. The current through the switch $S_1$ is equal to the sum of the resonance current $i_R(t)$ and the current through the inductive component $L_A$ and is given by $i_S(t)=(V_1/L_A)t+\hat{I}_R(\sin(\omega t-\theta_1)+\sin(\theta_1))$. If the current is zero when the switch turns off, the result is given by the amplitude of the resonance current $i_R(t)$ normalised about the mean switch current from $$\frac{\hat{I}_R}{I_{S_{AVG}}} = \frac{2 \cdot \pi \cdot D}{D \cdot (\cos(\theta_1) - \cos(2\pi D - \theta_1)) + \pi D^2 \cdot (\sin(\theta_1) + \sin(\theta_1 - 2 \cdot \pi D))}$$

where D is the fraction of a switching period $T_S$, during which the switch $S_1$ is switched on.

The gradient $\xi(t)$ of the current through the switch $S_1$ at the activation point should be a design parameter, as it defines the reverse current through the switch $S_1$ which should be kept as small as possible or even prevented. The reverse current is zero when the gradient is zero, which minimizes the load on the first switch $S_1$:

$$\xi(t) = \frac{1}{I_{S_{AVG}}} \cdot \frac{d}{dt} i_S(t)$$

Inserting the above expression for $i_S(t)$ in the expression for $\xi(t)$ results in the following expression for the angle of the resonance current:

$$\tan(\theta_1) = \frac{\sin(2\pi \cdot D) \cdot (V_1 \cdot (\omega - \pi D^2 \cdot \xi)) - \cos(2\pi \cdot D) \cdot (V_1 \cdot (D \cdot \xi + 2\pi \cdot D \cdot \omega)) + D \cdot V_1 \cdot \xi}{\cos(2 \cdot \pi \cdot D) \cdot (V_1(\omega - \pi D^2 \cdot \xi)) - V_1 \cdot \omega + \sin(2\pi D) \cdot (V_1 \cdot (D \cdot \xi + 2\pi \cdot D \cdot \omega)) - \pi D^2 \cdot V_1 \cdot \xi}$$

The inductance of the inductive component $L_A$ can then be calculated directly from the mean switch current.

By means of a Fourier analysis the fundamental component of the voltage on the inductive component $L_A$ can also be determined. When the switch $S_1$ is turned on, the voltage is equal to the input voltage $V_1$. When the switch $S_1$ is off, the voltage is determined from the resonance current through the inductive component $L_A$ in accordance with the law of induction. The quadratic component of this voltage is compensated by the capacitive component $C_A$. As a result, the output voltage and the resonance current are in phase and the input impedance of the first oscillator circuit 16 is exclusively resistive. By means of the compensation of the quadratic component by the capacitive component $C_B$, the second power stage 26" can be represented in terms of the fundamental frequency by a purely resistive load $R_O$. The input impedance of the first oscillator circuit 16 is therefore $$Z_l = \frac{1}{s \cdot C_{R1}} + s \cdot (L_1 - M) + \frac{1}{\frac{1}{s \cdot M} + \frac{1}{s \cdot (L_2 - M) + \frac{1}{s \cdot C_{R2}} + R_O}}$$

where M is a magnetic coupling between the circuits 16 and 28 of the resonant network (bordered by the middle dashed line).

If the system 10" is completely symmetrical with regard to the input and output voltage, the capacitances and the inductances, with $L_1=L_2=L$ and $C_{R1}=C_{R2}=C$ an input impedance is obtained which is equal to the ohmic resistance, i.e. $Z_1=R_O$.

This results in $$L = \frac{R_O}{k \cdot \omega} \cdot a_Q$$

$$C = \frac{L \cdot \omega^2 - \omega\sqrt{L^2 \cdot \omega^2 \cdot k^2 - R_O^2}}{L^2 \cdot \omega^4 - L^2 \cdot \omega^4 \cdot k^2 + R_O^2 \cdot \omega^2}$$

with $a_Q$ as the quality factor of the resonant circuits 16 and 28.

A similar derivation can be carried out for the system 10 shown in FIG. 1, wherein the first capacitive component $C_1$ and the second capacitive component $C_2$ are replaced by the parallel-connected capacitive components $C_A$ and $C_{R1}$ or $C_B$ and $CR_2$. In this case, the system 10 is analysed under the following assumptions, also idealized:

The input voltage $V_1$ and the output voltage $V_2$ are assumed to be ideal, or else generated by ideal voltage sources.

The switches $S_1$ and $S_2$ are assumed to be ideal, i.e. as switching instantaneously and with zero losses.

All reactive components are assumed to be ideal and thus lossless.

The current outputs of the power stages 22 and 26 extended by the capacitive components $C_A$ or $C_B$ lead to sinusoidal resonance voltages of the resonant circuits 16 and 28.

For the sinusoidal resonance voltage $v_R(t)$ at the output of the first power stage 22, the voltage on the inductive component $L_A$ and the switch current $i_S(t)$, with $V_R$ as amplitude of the resonance frequency of the switching frequency and current, ω as the angular frequency of the switching frequency and $\theta_1 = \omega T_1$ as the delay of the activation time of the switch $S_1$, are given by the following expressions:

$$v_R(t) = \hat{V}_R \cdot \sin(\omega \cdot t)$$

$$v_L(t) = V_1 - \hat{V}_R \cdot \sin(\omega \cdot t)$$

$$i_S(t) = \frac{V_1 \cdot (\omega \cdot t - \theta_1) + \hat{V}_R \cdot (\cos(\omega \cdot t) - \cos(\theta_1))}{\omega \cdot L_A}$$

By incorporating the constraint that the switch current is zero at the deactivation time, the amplitude of the resonance current $V_R$ evaluates to $$\frac{\hat{V}_R}{V_1} = \frac{2 \cdot \pi \cdot D}{\cos(\theta_1) - \cos(\theta_1 + 2 \cdot \pi \cdot D)}$$

In the same way, the average switch current can be calculated from $i_S(t)$. With the gradient $\xi(t)$ of the current through the switch $S_1$ at the deactivation time as a design parameter, the following expression is obtained $$\tan(\theta_1) = \frac{\sin(2\pi D) \cdot (2 \cdot \omega - 2\pi \cdot D^2 \cdot \xi) - \cos(2\pi \cdot D) \cdot (4\pi \cdot D \cdot \omega + 2 \cdot D \cdot \xi) + 2 \cdot D \cdot \xi}{\sin(2\pi \cdot D) \cdot (4\pi \cdot D \cdot \omega + 2 \cdot D \cdot \xi) - 2 \cdot \omega + \cos(2\pi \cdot D) \cdot (2 \cdot \omega - 2\pi \cdot D^2 \cdot \xi) - 2\pi \cdot D^2 \cdot T_S}$$

Using a Fourier analysis, the fundamental component of the switch current can also be determined. The quadratic component of this current is compensated by the capacitive component $C_A$. As a result, the output current and the resonance voltage are in phase and the input impedance of the first oscillator circuit 16 is exclusively resistive. By means of the compensation of the quadratic component by the capacitive component $C_B$, the second power stage 26" can be represented in terms of the fundamental frequency by a purely resistive load $R_O$. The input impedance of the first oscillator circuit 16 is therefore $$Z_I = \cfrac{1}{s \cdot C_{R1} + \cfrac{1}{s \cdot (L_1 - M) + \cfrac{1}{\cfrac{1}{s \cdot M} + \cfrac{1}{s \cdot (L_2 - M) + \cfrac{1}{\cfrac{1}{R_O} + s \cdot C_{R2}}}}}}$$

with M as the magnetic coupling.

If the system 10 is completely symmetrical with regard to the input and output voltage, the capacitances and the inductances, with $L_1 = L_2 = L$ and $C_{R1} = C_{R2} = C$ an input impedance is obtained which is equal to the ohmic resistance, i.e. $Z_1 = R_O$. This results in $$C = \sqrt{\frac{1}{R_O^2 \cdot \omega^2} \cdot \frac{1 - k^2}{k^2}} \cdot a_Q$$

$$L = \frac{R_O \cdot \left(\sqrt{C^2 \cdot R_O^2 \cdot k^2 \cdot \omega^2 + k^2 - 1} - C \cdot R_O \cdot \omega\right)}{\omega(C^2 \cdot R_O^2 \cdot \omega^2 + 1) \cdot (k^2 - 1)}$$

with $a_Q$ as the quality factor of the resonant circuits 16 and 28.

For an example use case with $V_1 = 360V$, $V_2 = 360V$, a transmission power of 3.6 kW at a switching frequency of 100 kHz, $\xi = 0$ and $D = 0.45$ with a coupling factor of $k = 0.3$ and $a_Q = 1$, the following values can be calculated:

|  | System 10 | System 10' |
|---|---|---|
| $L_A$ | 10.98 µH | 10.98 µH |
| $C_A$ | 267.8 nF | 32.01 nF |
| $C_R$ | 481.0 nF | 105.5 nF |
| $L$ | 5.27 µH | 24.0 µH |
| $\hat{i}_R$ | 85.2 A | 38.9 A |
| $\hat{V}_R$ | 281.8 V | 587.8 V |

In this context, however, it should be noted that these values have a purely exemplary character, in order to illustrate the content of the above equations, and real systems preferably require $a_Q > 1$ and preferably $a_Q > 5$ in order to satisfy the above assumptions.

Figure 5:
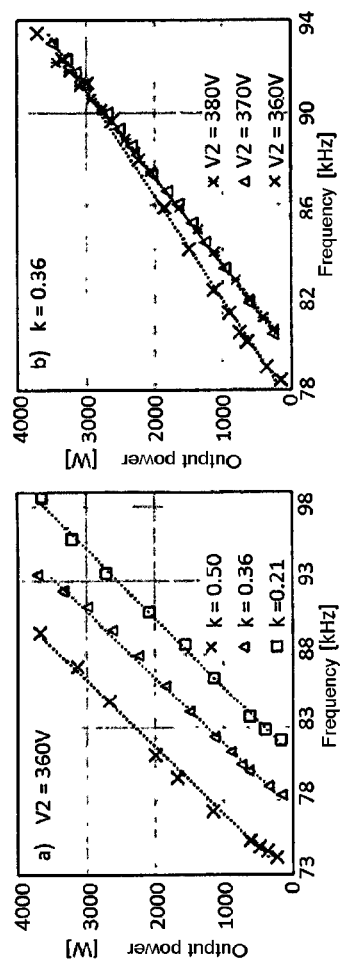
FIG. 5 measurements with regard to the output power on a real system for inductive energy transmission in accordance with the first preferred embodiment.
Figure 6:
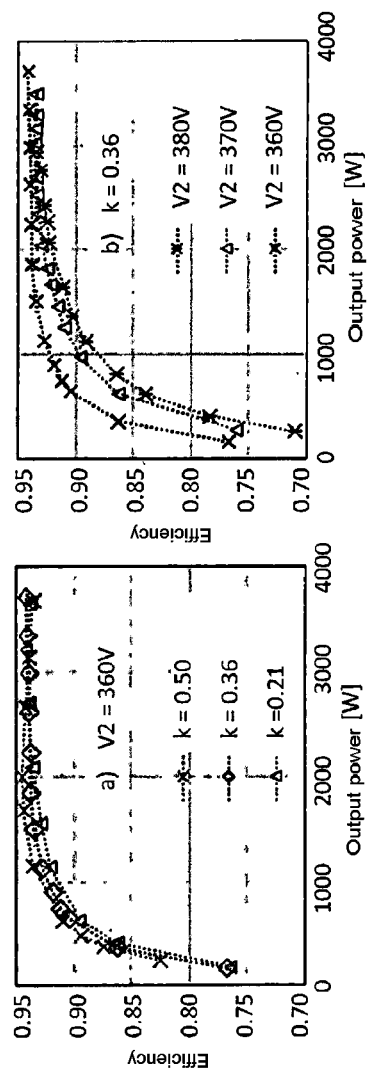
FIG. 6 measurements with regard to the efficiency of a real system for inductive energy transmission in accordance with the first preferred embodiment.

FIG. 5 and FIG. 6 show measurements relating to the output power and efficiency of a real system 10 for inductive energy transmission in accordance with the first preferred embodiment with $L1 = L2 = 0.18$ µH, $C1 = C2 = 160$ nF, $LA = LB = 12$ µH for different magnetic coupling factors k and output voltages $V_2$. FIG. 5 shows that for different magnetic coupling factors k, different switching frequency bands must be used to control the output power. FIG. 6 also shows that the efficiency increases with increasing frequency, resulting in a working range for the selected parameters of preferably more than 80 kHz.

Figure 7:
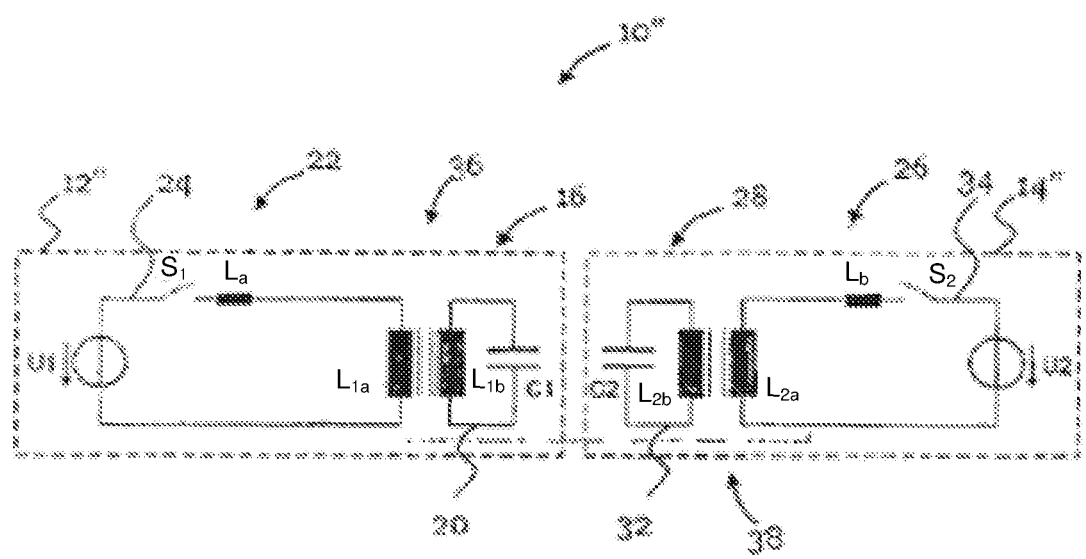
FIG. 7 an equivalent circuit diagram of a system for inductive energy transmission in accordance with a third preferred embodiment.

FIG. 7 shows an equivalent circuit diagram of a system 10" for inductive energy transmission in accordance with a third preferred embodiment. The system 10" corresponds to the system 10 shown in FIG. 1, wherein the first power stage 22 is coupled to the first resonant circuit 16 by means of a first transformer circuit 36. The first transformer circuit 36 comprises a first inductive component L1a, which is connected in series with the switch $S_1$, and a second inductive component L1b, which is arranged in the first oscillator circuit 16. The inductive components L1a and L1b are implemented as coils wound around a common core, which generate an alternating magnetic field in operation, which inductively couples the first resonant circuit 16 with the inductive components L2a and L2b of the second circuit 14".

The second circuit 14" is designed symmetrically to the first circuit 12" and comprises the second power stage 26, which is coupled with the second oscillator 28 by means of a second transformer circuit 38. The second transformer circuit 38 comprises a third inductive component L2a, which is connected in series with the switch $S_2$, and a fourth inductive component L2b, which is arranged in the second oscillator circuit 28. The second circuit 14" therefore comprises two separate circuits 32 and 34, which are inductively coupled. In this context, it should also be noted that if the inductive components are implemented as coils, for example, symmetry is produced by equal numbers of turns of the inductively coupled windings of the first and second oscillator circuit 16 and 28 with equal inductances and capacitances of the first and second oscillator circuit 16 and 28 (transformer ratio 1). Moreover, symmetry in the sense of the application is also obtained with "different" values for the inductances and capacitances of the first and second oscillator circuit 16 and 28, taking into account the turns ratio of the windings of the first and second oscillator circuit 16 and 28 (different numbers of turns, i.e. transformer ratio is unequal to 1—but secondary-side components that are matched to the transformer ratio). In other words, the components related to the primary side should preferably be the same, in order to obtain a fully symmetrical system. By means of the winding ratio, the output voltage can be varied as desired and the system 10" still operates symmetrically. The transformer ratio can be present at any point, if more than two windings are coupled in the system 10" (see FIG. 8). By the transformation of the secondary side components onto the primary side, both the resonant frequency as well as the quality of the two resonant circuits 16 and 28 match are equal at different voltages and currents.

In addition, instead of having two inductive components Lb and L2a, the current path 34 which comprises the switch $S_2$ can also comprise only one inductive component, which has the same total inductance as the two inductive components Lb and L2a. In the same way, instead of having two inductive components La and L1a, the current path 24 which comprises the switch $S_1$ can also comprise only one inductive component, which has the same total inductance as the two inductive components La and L1a. In addition, the current paths 24 and 32 can be provided with saturation inductors (not shown).

Figure 8:
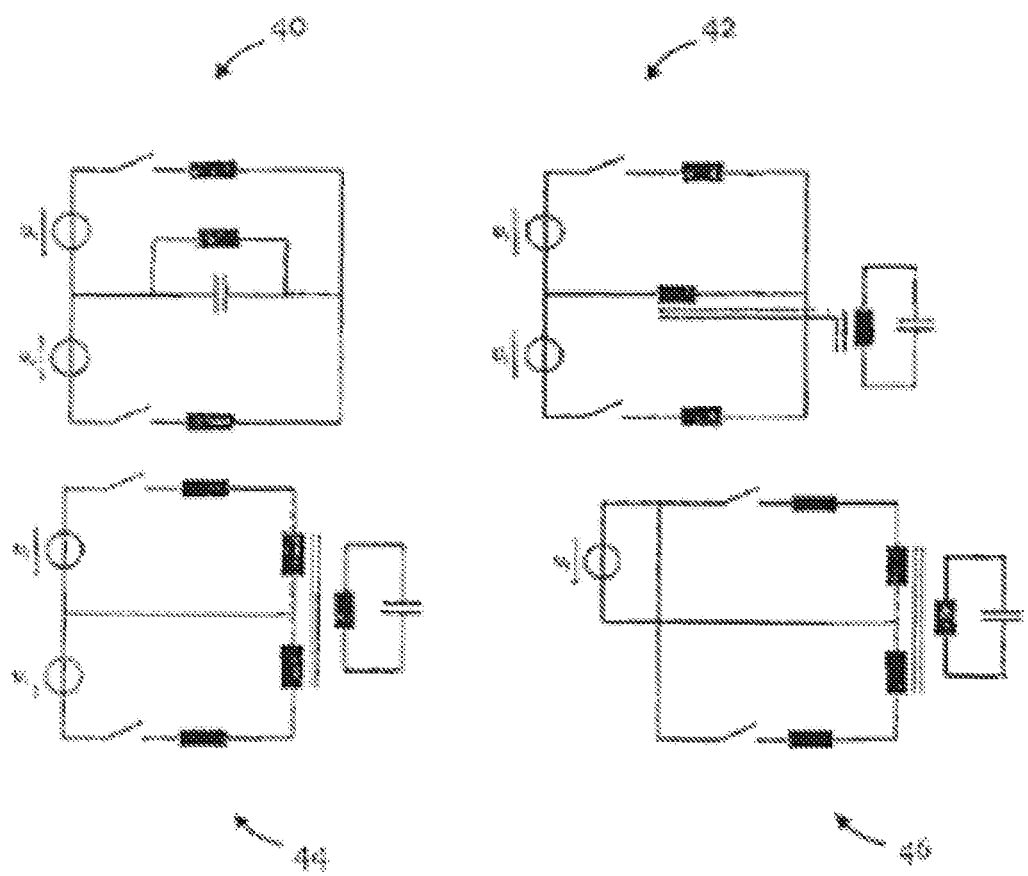
FIG. 8 equivalent circuit diagrams of first circuits for inductive energy transmission in accordance with a fourth, fifth, sixth and seventh preferred embodiment.

FIG. 8 shows equivalent circuit diagrams of first circuits 40-46 for inductive energy transmission in accordance with a fourth, fifth, sixth and seventh preferred embodiment. It should be noted that the first circuits 40-46 could be extended, for example, by adding symmetrical second circuits to form systems for inductive energy transmission. The first circuit 40 here corresponds to the first circuit 12, which is implemented as a push-pull circuit by means of a second voltage source $U_2$, a third switch and an inductive component connected in series with the third switch. In this context, it should be noted that the provision of a push-pull circuit enables different modes of operation depending on the design of the second circuit 14. If the second circuit 14 is designed as illustrated in FIG. 1, then for example, only the upper or the lower switch must be switched. If the second circuit 14 is modified by adding a fourth switch, however, in such a way that it is symmetrical to the first circuit 40, then the two first power stages 22 of the first circuit 40 can be operated with a phase delay (for example by 180°).

The first circuit 42 corresponds to the first circuit 40, wherein the first oscillator circuit 16 is coupled to the first power stages 22 by means of a first transformer circuit 36, as is shown in FIG. 7 for a single first power stage 22, the first circuit 12" of which can be extended by the modifications to a push-pull circuit shown in connection with the first circuit 42. Furthermore, the first circuit 44 differs from the first circuit 42 in the fact that the first oscillator circuit 16 is coupled to the first output stages 22 by means of two first transformer circuits 36. In addition, the first output stages 22 can be implemented by means of a common voltage source $U_1$, as in the case of the first circuit 46.

Figure 9:
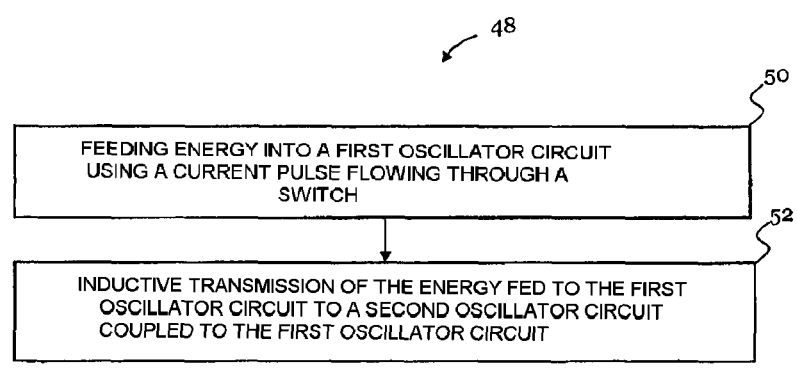
FIG. 9 shows a process for inductive transmission of energy.

FIG. 9 shows a process 48 for inductive transmission of energy in the systems 10, 10' and 10" shown, incorporating the described modifications. The process begins at 50 with the supply of energy into the first oscillator circuit 16 by means of a current pulse flowing through the switch $S_1$. The energy fed to the first oscillator circuit 16 is then transmitted at 52 to the second oscillator circuit 26, which is inductively coupled with the first oscillator circuit 16. In the event of a reverse current occurring, the activation time (and optionally the deactivation time) of the second switch $S_2$ can be varied until the reverse current through the second switch $S_2$ drops below a predetermined value, preferably to a minimum, and particularly preferably becomes zero. In addition, as described above, control information can also be transmitted from the first power stage 22 to the second power stage 26, and in response to the control information the second control logic can vary the activation time (and optionally the deactivation time) of the second switch $S_2$ and in doing so handle a larger reverse current in order to reduce or prevent a reverse current through the first switch $S_1$. The variation of the activation time (and optionally the deactivation time) of the second switch $S_2$ thus compensates asymmetrical current and voltage curves occurring in the circuits 12 and 14.

Figure 10:
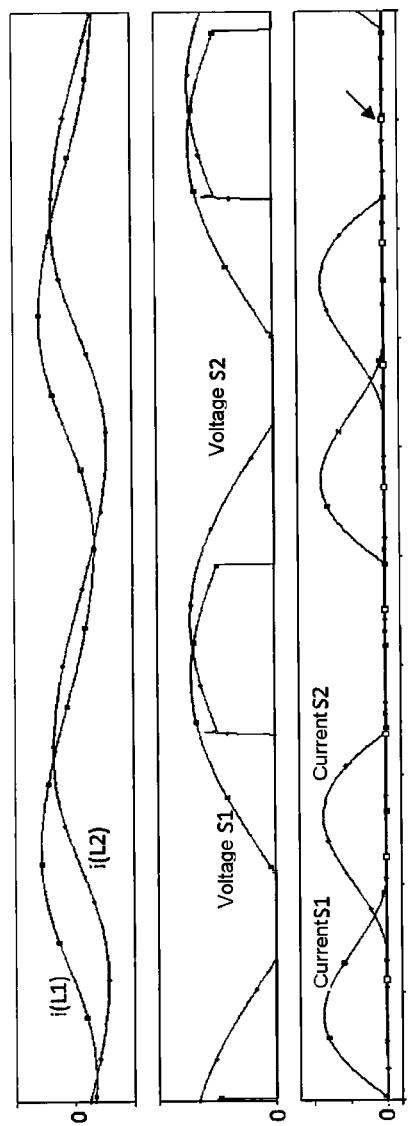
FIGS. 10-12 a variation of the activation time of the second switch for reducing voltages that drive reverse currents through the switch.
Figure 11:
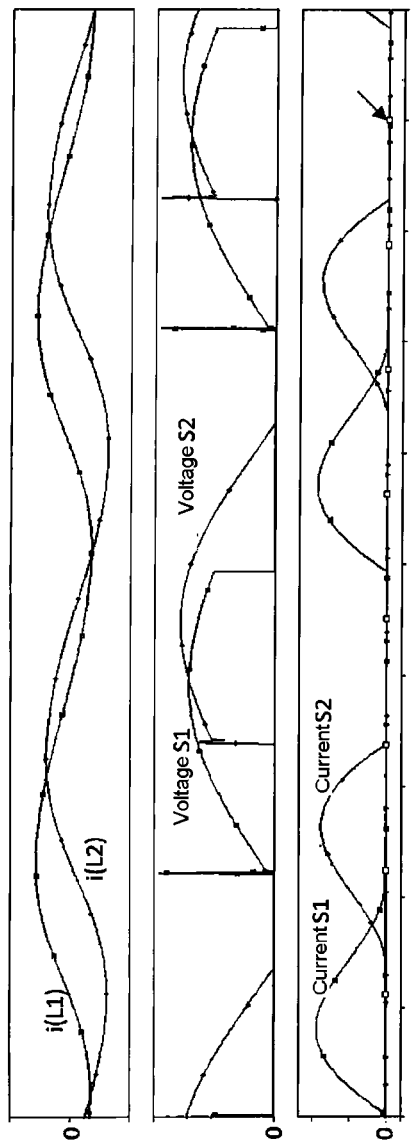
Figure 12:
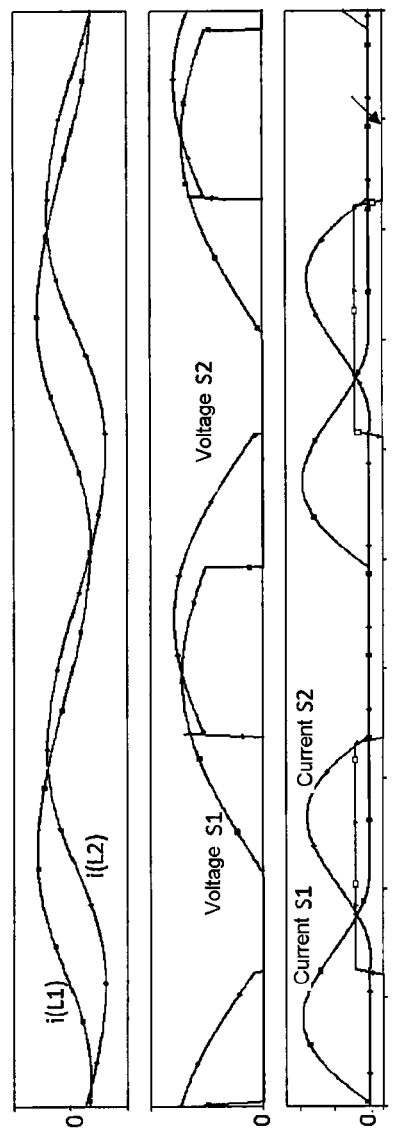

FIGS. 10-12 show a variation of the activation time of the second switch $S_2$ for reducing voltages, which drive reverse currents through the first switch $S_1$. Of these, FIG. 10 shows the operation of the system 10 under optimal conditions, i.e. di(t)/dt=0 when the first switch $S_1$ is turned off. FIG. 11 shows the effect of an increase in the output voltage of the system 10 by 25%, which without compensation causes a voltage spike on the first switch $S_1$. By bringing forward the activation time of the second switch $S_2$ (which causes a small reverse current through the second switch $S_2$), the occurrence of the voltage spike can be prevented, as shown in FIG. 12, so that the first switch $S_1$ again switches under (approximately) zero current.

Figure 13:
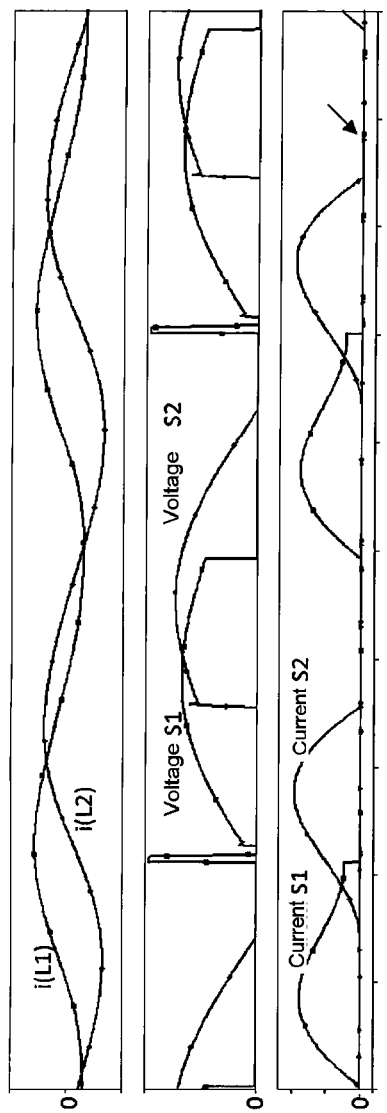
FIGS. 13 and 14 a variation of the activation time of the second switch for reducing voltages that drive reverse currents through the switch, in the case of tolerance-prone components.
Figure 14:
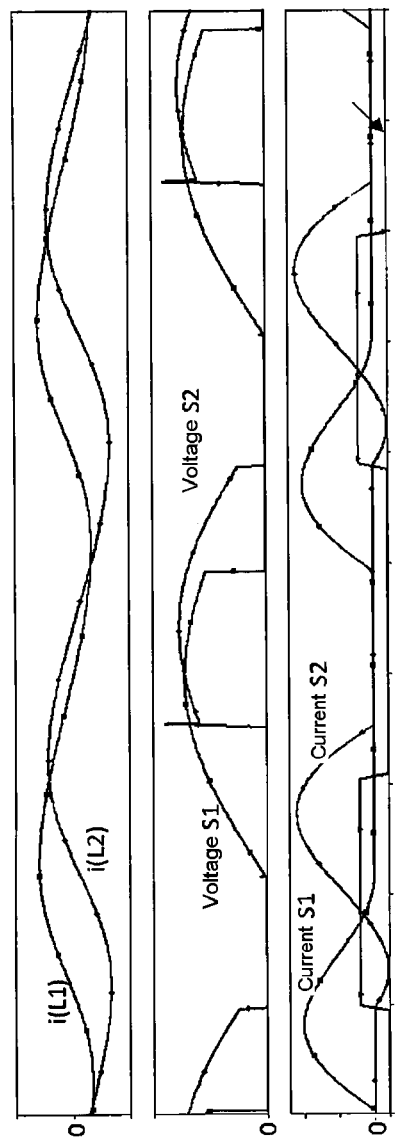

FIG. 13 shows a scenario in which the capacitance of the second capacitive component $C_2$ is 10% larger than the capacitance of the first capacitive component $C_1$ and the first switch $S_1$ is not switched at zero current. By bringing forward the activation time of the second switch $S_2$, however, as shown in FIG. 14, a switching of the first switch $S_1$ under (approximately) zero current can be enabled.

In the scenarios shown in FIGS. 10-14 for implementing a closed-loop control, the flow of current through the first switch $S_1$ can be measured and control commands derived from the occurrence of a reverse current through the first switch $S_1$ can be transmitted via a communication interface to the second circuit 14, which varies the activation time of the second switch $S_2$ in agreement with the control commands.

Figure 15:
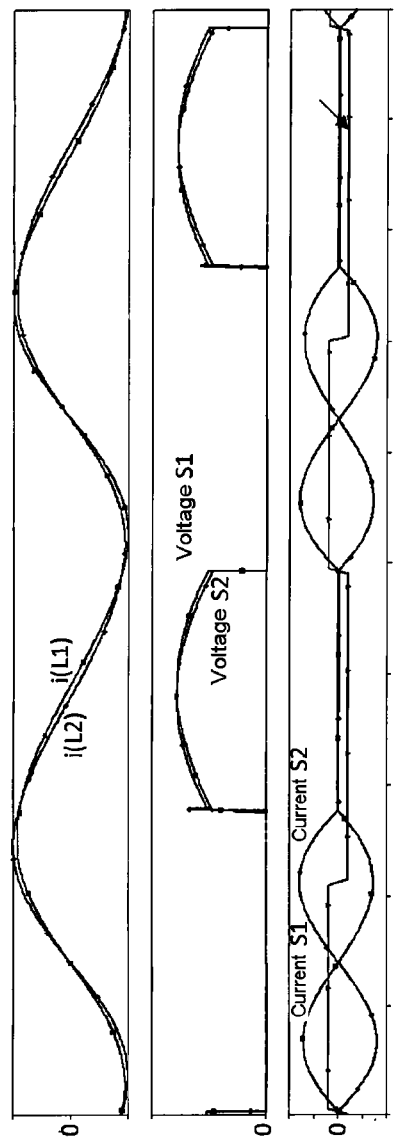
FIG. 15 a variation of the activation time of the second switch while maintaining a switching frequency specified by the first switch, to control the size of the flow of energy from the first circuit to the second circuit.

FIG. 15 shows a variation of the activation time of the second switch while maintaining a switching frequency specified by the first switch $S_1$, in order to control the size of the energy flow from the first circuit 12 to the second circuit 14. In this case, the activation time of the second switch $S_2$ can be brought forward to such an extent that it turns on together with the first switch $S_1$. In this "zero-power" operating mode a calibration of the parameters of the system 10 and therefore the system response is possible. FIG. 15 also shows that, for a constant switching frequency, by variation of the activation time of the second switch $S_2$ the energy flow from the first circuit 12 to the second circuit 14 can be controlled from a maximum value to zero.

Figure 16:
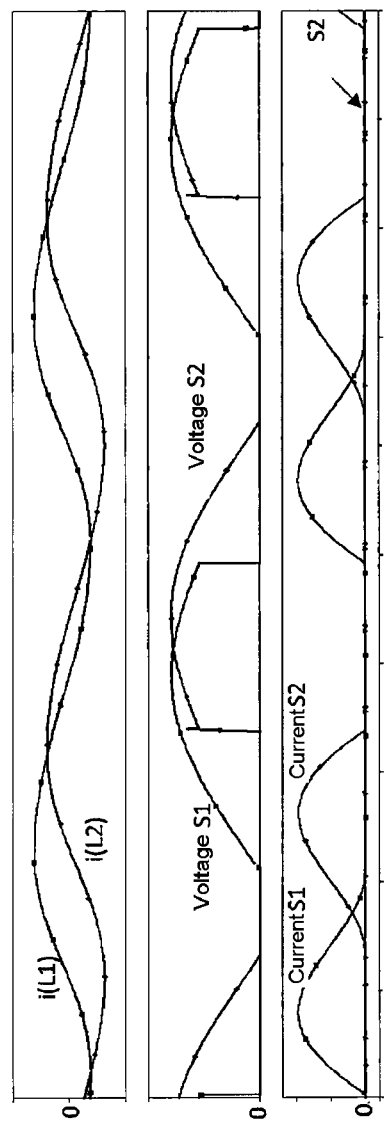
FIG. 16 shows a variation of the input voltage of the first circuit, for reducing the voltages that drive reverse currents through the switch.

FIG. 16 shows a variation of the input voltage of the first circuit 12, for reducing the voltages that drive reverse currents through the first switch $S_1$. In this case the effect shown in FIG. 11 of an increase in the output voltage of the system 10 by 25% is compensated by the input voltage of the first circuit 12 also being increased by 25%, which means that the first switch $S_1$ can again be switched under (approximately) zero current.

REFERENCE LIST 10-10" system
12-12" first circuit
14-14" second circuit
16 first oscillator circuit
18 conduction path
20 conduction path
22, 22' first power stage
24 conduction path
26, 26' second power stage
28 second current resonant
30 conduction path
32 conduction path
34 conduction path
36 first transformer circuit
38 second transformer circuit
40 first circuit
42 first circuit
44 first circuit
46 first circuit
48 process
50 process step
52 process step

The invention claimed is:

1. A system for inductive energy transmission to a battery of a vehicle, comprising:
a first circuit and a second circuit,
wherein the first circuit comprises a first oscillator circuit and the second circuit a second oscillator circuit, wherein said second oscillator circuit is coupled to said battery of said vehicle,
wherein the first oscillator circuit and the second oscillator circuit are configured and designed to be inductively coupled during the inductive energy transmission,
wherein the first oscillator circuit and the second oscillator circuit have an equal nominal resonance frequency,
wherein the first oscillator circuit is designed as a parallel resonant circuit coupled via a switch to an electrical connector, which is configured and designed to be connected to an electrical supply line during the inductive energy transmission,
wherein said parallel resonant circuit forming said first oscillator circuit is coupled via a first inductive component connected in series with the switch, and
wherein the switch is also connected to a control logic, which is configured and designed to turn the switch on and off again during an oscillation period of the first oscillator circuit, wherein a current pulse flows through the switch during the inductive energy transmission after the activation and before the deactivation of the switch, wherein energy is fed to the first oscillator circuit by means of the current pulse flowing through the switch, wherein the control logic is also configured not to switch the activated switch off again after it is switched on, until after a current through the switch has decayed.

2. The system for inductive energy transmission according to claim 1, wherein the first oscillator circuit is coupled to the switch via a transformer circuit which comprises the first inductive component.

3. The system for inductive energy transmission according to claim 2, wherein the first oscillator circuit is configured and designed to be inductively coupled to the second oscillator circuit via the transformer circuit during the inductive energy transmission.

4. The system for inductive energy transmission according to claim 1, wherein the first oscillator circuit and the second oscillator circuit have an equal nominal capacitance and inductance.

5. The system for inductive energy transmission according to claim 1,
wherein the second oscillator circuit is coupled via a second switch to a second connector, which is configured and designed to be connected to a second electrical supply line during the inductive energy transmission, and
wherein the second switch is also connected to a second control logic, which is configured and designed to switch the second switch on and off again during an oscillation period of the second oscillator circuit, wherein during the inductive energy transmission a second current pulse flows through the second switch after the second switch is turned on and before it is turned off, wherein energy is extracted from the second oscillator circuit by means of the current pulse flowing through the second switch.

6. The system for inductive energy transmission according to claim 5, wherein the second oscillator circuit is designed as a parallel resonant circuit and is coupled to the second switch via a second inductive component connected in series with the switch.

7. The system for inductive energy transmission according to claim 6, wherein the second switch is coupled to the second oscillator circuit via a transformer circuit which comprises the second inductive component.

8. The system for inductive energy transmission according to claim 5, wherein the second control logic is also configured not to switch the activated second switch off again once it is switched on until after the current pulse through the second switch has decayed.

9. The system for inductive energy transmission according to claim 5, wherein the second switch is designed as a semiconductor switch and the second control logic is also configured to turn the activated second semiconductor switch off again after it is turned on, before or immediately after a reverse current through the second semiconductor switch following the second current pulse has decayed.

10. The system for inductive energy transmission according to claim 8, wherein the second control logic is configured to receive a control command from the control logic and in response to the control command, to admit a reverse current through the second switch after the decay of the current through the second switch.

11. The system for inductive energy transmission according to claim 5, wherein the second control logic and the second switch are configured to form a zero-current-switched class-E power stage during the inductive energy transmission.

12. The system for inductive energy transmission according to claim 5, wherein the first circuit and the second circuit are symmetrical.

13. The system for inductive energy transmission according to claim 5, wherein the control logic is configured to control a flow of energy from the first circuit to the second circuit by a variation of the activation time of the switch and a variation of the activation time of the second switch.

14. The system for inductive energy transmission according to claim 5, wherein the second control logic is configured to vary an activation time of the second switch while maintaining a switching frequency specified by the switch, in order to control the size of the energy flow from the first circuit to the second circuit.

15. The system for inductive energy transmission according to claim 5, wherein the control logic is configured to detect voltages and/or currents, which drive reverse currents through the switch; and
    wherein the second control logic is configured to vary an activation time of the second switch while maintaining a switching frequency specified by the switch, in order to reduce the voltages that drive reverse currents through the switch.

16. The system for inductive energy transmission according to claim 1, wherein the second oscillator circuit is coupled via a passive rectifier element to a second connector, which is configured and designed to be connected to a second electrical supply line during the inductive energy transmission, and wherein during the inductive energy transmission the second oscillator circuit feeds the second electrical supply line with a second current pulse through the passive rectifier element, wherein energy is extracted from the second oscillator circuit by means of the second current pulse flowing through the passive rectifier element.

17. The system for inductive energy transmission according to claim 16, wherein the control logic is configured to detect voltages and/or currents which drive reverse currents through the switch; and
    to vary an input voltage of the first circuit, in order to reduce the voltages that drive reverse currents through the switch.

18. The system for inductive energy transmission according to claim 5, wherein during the inductive energy transmission, a reduction of the current flowing in the first oscillator circuit induced in the first oscillator circuit by the extraction of energy from the second oscillator circuit is overcompensated immediately after the switch is turned on.

19. The system for inductive energy transmission according to claim 18, wherein the overcompensation persists for half of a switched-on period.

20. The system for inductive energy transmission according to claim 18, wherein the overcompensation is immediately followed by an under-compensation, which lasts until a surplus current flow produced by the overcompensation in the first oscillator circuit is balanced out again.

21. The system for inductive energy transmission according to claim 5, wherein the switch and/or the second switch are designed as full-wave switches.

22. The system for inductive energy transmission according to claim 1, wherein the switch is designed as a semiconductor switch and the control logic is also configured to switch the activated semiconductor switch off again after it is switched on, before or immediately after a reverse current through the semiconductor switch following the current pulse has decayed.

23. The system for inductive energy transmission according to claim 1, wherein the control logic and the switch are configured to form a zero-current-switched class-E power output stage during the inductive energy transmission.

24. The system for inductive energy transmission according to claim 1, wherein the control logic is further configured to measure a current flow through the switch.

25. The system for inductive energy transmission according to claim 1, wherein the first oscillator circuit is a semiconductor-switch-free oscillator circuit.

26. The system for inductive energy transmission according to claim 1, wherein the first oscillator circuit is also coupled to the electrical connector via a third switch,
    wherein the third switch is also connected to the control logic, which is configured to switch the third switch on and off again during the oscillation period of the first oscillator circuit with a time delay relative to the switch,
    wherein during the inductive energy transmission after turning on and before turning off the third switch, a third current pulse flows through the third switch, whose current direction is opposite that of the current pulse, and
    wherein energy is fed to the first oscillator circuit by means of the current pulse flowing through the third switch.

27. The system for inductive energy transmission according to claim 26, wherein the first oscillator circuit is designed as a parallel resonant circuit and is coupled to the third switch via a second inductive component connected in series with the third switch.

28. The system for inductive energy transmission according to claim 27, wherein the first oscillator circuit is coupled to the third switch via a second transformer circuit which comprises the second inductive component.

29. The system for inductive energy transmission according to claim 28, wherein the first oscillator circuit is configured and designed to be inductively coupled to the second oscillator circuit via the second transformer circuit during the inductive energy transmission.

30. The system of claim 1, wherein said control logic is configured to vary an activation frequency of said switch to control a power transmitted from said first circuit to said second circuit.

31. The system of claim 1, wherein components included in the first and second oscillator circuits are matched such that both the resonant frequency as well as the quality factor of the first and second oscillator circuits are equal at different voltages and currents.

32. The system of claim 30, wherein the second oscillator circuit is coupled via a second switch to a second connector, which is configured and designed to be connected to a second electrical supply line during the inductive energy transmission,
    wherein the second switch is also connected to a second control logic, which is configured and designed to switch the second switch on and off again during an oscillation period of the second oscillator circuit, wherein during the inductive energy transmission a second current pulse flows through the second switch after the second switch is turned on and before it is turned off, wherein energy is extracted from the second oscillator circuit by means of the current pulse flowing through the second switch, and wherein the control logic is configured to receive a second control command from the second control logic and configured to increase or decrease a switching frequency of the switch in response to the second control command, to thereby adjust a charging current for said battery.

* * * * *